US010387765B2

(12) United States Patent
Mailhe et al.

(10) Patent No.: US 10,387,765 B2
(45) Date of Patent: Aug. 20, 2019

(54) IMAGE CORRECTION USING A DEEP GENERATIVE MACHINE-LEARNING MODEL

(71) Applicant: Siemens Healthcare GmbH, Erlangen (DE)

(72) Inventors: Boris Mailhe, Plainsboro, NJ (US); Hasan Ertan Cetingul, Fulton, MD (US); Benjamin L. Odry, West New York, NJ (US); Xiao Chen, Princeton, NJ (US); Mariappan S. Nadar, Plainsboro, NJ (US)

(73) Assignee: Siemens Healthcare GmbH, Erlangen (DE)

( * ) Notice: Subject to any disclaimer, the term of this patent is extended or adjusted under 35 U.S.C. 154(b) by 193 days.

(21) Appl. No.: 15/596,124

(22) Filed: May 16, 2017

(65) Prior Publication Data
US 2017/0372193 A1    Dec. 28, 2017

Related U.S. Application Data

(60) Provisional application No. 62/353,713, filed on Jun. 23, 2016.

(51) Int. Cl.
  *G06K 9/62* (2006.01)
  *G06N 3/02* (2006.01)
  *G06T 5/00* (2006.01)
  *G06T 7/00* (2017.01)

(52) U.S. Cl.
  CPC ........... *G06N 3/02* (2013.01); *G06T 5/001* (2013.01); *G06T 5/002* (2013.01); *G06T 5/003* (2013.01); *G06T 5/005* (2013.01); *G06T 7/0002* (2013.01); *G06T 2207/10072* (2013.01); *G06T 2207/10132* (2013.01); *G06T 2207/20081* (2013.01); *G06T 2207/20084* (2013.01); *G06T 2207/30004* (2013.01)

(58) Field of Classification Search
None
See application file for complete search history.

(56) References Cited

U.S. PATENT DOCUMENTS

| 9,569,843 | B1 | 2/2017 | Mailhe et al. | |
| 2011/0144752 | A1* | 6/2011 | Defelice | A61F 2/28 623/16.11 |
| 2013/0053689 | A1* | 2/2013 | Das | A61B 6/03 600/425 |

OTHER PUBLICATIONS

U.S. Appl. No. 15/266,425, filed Sep. 15, 2016.
U.S. Appl. No. 15/471,079, filed Mar. 28, 2017.
Bora, Ashish, et al. "Compressed Sensing using Generative Models." arXiv preprint arXiv:1703.03208 (2017).
Chang, S. Grace, Bin Yu, and Martin Vetterli. "Adaptive wavelet thresholding for image denoising and compression." IEEE Transactions on image processing 9.9 (2000): 1532-1546.

(Continued)

*Primary Examiner* — Stephen P Coleman

(57) ABSTRACT

For correction of an image from an imaging system, a deep-learnt generative model is used as a regularlizer in an inverse solution with a physics model of the degradation behavior of the imaging system. The prior model is based on the generative model, allowing for correction of an image without application specific balancing. The generative model is trained from good images, so difficulty gathering problem-specific training data may be avoided or reduced.

20 Claims, 2 Drawing Sheets

(56) References Cited

OTHER PUBLICATIONS

Jain, Viren, et al. "Supervised learning of image restoration with convolutional networks." Computer Vision, 2007. ICCV 2007. IEEE 11th International Conference on. IEEE, 2007.
Lexing Xie, et al. "Image Restoration" LectureColumbia University of New York; Mar. 23, 2009.
Salakhutdinov, Ruslan. Learning deep generative models. Diss. University of Toronto, 2009.
Venkatakrishnan, Singanallur V., Charles A. Bouman, and Brendt Wohlberg. "Plug-and-play priors for model based reconstruction." Global Conference on Signal and Information Processing (GlobalSIP), 2013 IEEE. IEEE, 2013.

* cited by examiner

IMAGE CORRECTION USING A DEEP GENERATIVE MACHINE-LEARNING MODEL

RELATED APPLICATIONS

The present patent document claims the benefit of the filing date under 35 U.S.C. § 119(e) of Provisional U.S. Patent Application Ser. No. 62/353,713, filed Jun. 23, 2016, which is hereby incorporated by reference.

BACKGROUND

The present embodiments relate to image correction. Images often include artifacts. The image may be restored by reducing the artifacts. Image restoration tasks, such as denoising, deblurring, inpainting, or reconstruction are inverse problems in which a degradation operator was applied to the image. The original image is recovered by combining a physical model of the degradation behavior and a prior model of what a good image should be. Image restoration is typically cast as a Maximum A Posteriori (MAP) estimation problem, then solved using constrained optimization.

Prior approaches to solve for this inverse problem include manually crafting a prior model and an algorithm to provide a good compromise between the reconstruction quality and the complexity of the algorithm. These prior approaches suffer from simplistic assumptions to reduce the complexity of the manual prior and from the requirement for balancing this compromise that may be different for many different situations. Another approach uses supervised machine learning to output a corrected image given an input image. The machine-learning approach suffers from a lack of availability of a sufficiently large set of distortion and imaging system-specific training data and from poor generalization: if the distortion, then the mapping must be re-trained from scratch although the observed object is the same.

SUMMARY

By way of introduction, the preferred embodiments described below include methods, systems, instructions, and non-transitory computer readable media for correction of an image from an imaging system. A deep-learnt generative model is used as a regularlizer in an inverse solution with a physics model of the degradation behavior of the imaging system. The prior model is based on the generative model, allowing for correction of an image without application specific balancing. The generative model is trained from good images, so difficulty gathering problem-specific training data may be avoided or reduced.

In a first aspect, a method is provided for correction of an image from a medical scanner. The medical scanner acquires the image representing a patient. The image has a level of artifact due to the acquisition process by the medical scanner. A machine determines a probability of artifact abnormality for the image with a deep generative machine-learnt model. The machine minimizes the level of the artifact in the image. The minimization is a function of a physics model of the artifacts and the prior probability of the image. The physics model includes a characteristic specific to the medical scanner. The image output from the minimizing is transmitted. The image is of the patient and from the medical scanner with the level of the artifact minimized.

In a second aspect, a method is provided for reducing distortion in an image from an imaging system. The image of an object is optimized to have less of the distortion. The optimization is with a gradient-based optimization including a regularizer from a log-likelihood output by a machine-learnt generative model. The image as optimized is output.

In a third aspect, a method is provided for correction of a first image from an imaging system. The imaging system acquires the first image having a distortion due to the acquisition by the imaging system. A machine determines a likelihood of the first image having the distortion with a deep generative machine-learnt model. A corrected image is solved for from the first image. The solving uses the likelihood and a transform for the imaging system. The corrected image is transmitted.

The present invention is defined by the following claims, and nothing in this section should be taken as a limitation on those claims. Further aspects and advantages of the invention are discussed below in conjunction with the preferred embodiments and may be later claimed independently or in combination.

BRIEF DESCRIPTION OF THE DRAWINGS

The components and the figures are not necessarily to scale, emphasis instead being placed upon illustrating the principles of the invention. Moreover, in the figures, like reference numerals designate corresponding parts throughout the different views.

DETAILED DESCRIPTION OF THE DRAWINGS AND PRESENTLY PREFERRED EMBODIMENTS

Deep generative models directly evaluate the probability of a new image to belong to the same category as the training data. For example, deep generative models may predict whether a photograph is of a bird or not. While those models have shown their ability to synthesize natural-looking images, such as of a bird, the generative models have seen little use in other tasks due to their complexity, which does not allow easy manipulation by an inference or optimization algorithm.

The deep generative model may be used for image correction. The inverse problem is solved using deep priors. To recover an underlying image X given corrupted measurements Y, a deep generative model is integrated into the inverse problem framework rather than to replace the framework. The generative model takes an image as its input and returns the prior log-likelihood of the image. This log-likelihood is used as a regularization term in the inverse problem. Solving the inverse problem reduces the distortions, reconstructing the more ideal or corrected image X from the corrupted measurements Y.

Figure 1:
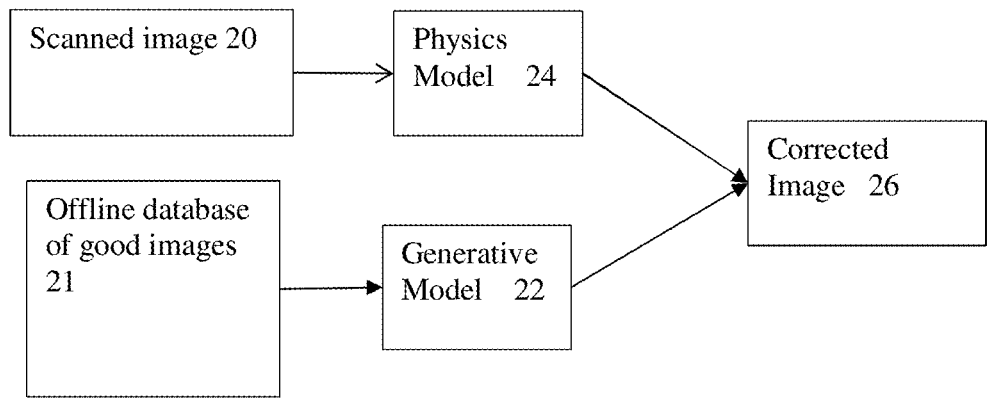
FIG. 1 illustrates an example combination of a generative model and physics model for inverse solution.

FIG. 1 illustrates one embodiment of the process for correcting the image. A generative model 22 is learned from a database of good images 21. The generative model 22 learns to output a probability based on input of an image 20.

A physics model 24 and probabilities from the generative model 22 are used iteratively to solve for the corrected image 26.

Figure 2:
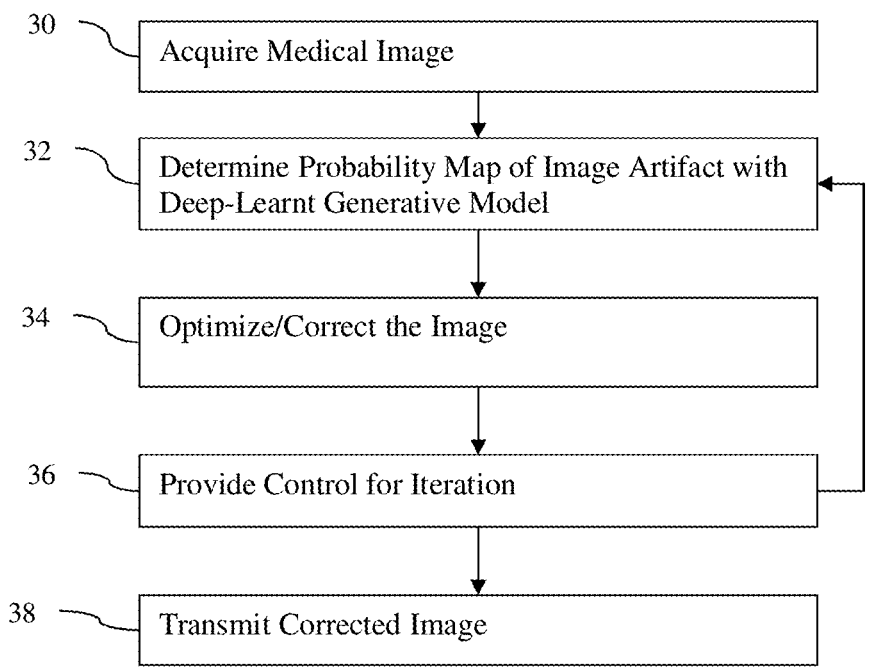
FIG. 2 illustrates one embodiment of a method for correction of an image from a medical scanner or other imaging system.

FIG. 2 shows one embodiment of a method for correction of an image from an imaging system, such as a medical scanner. The method is illustrated in the context of medical imaging, but may be applied in other contexts (e.g., photographs, material testing, astronomy, or seismic sensing).

FIG. 2 is directed to application of the generative model 22 in an inverse problem solution. Any distortions in the measurements Y used to generate the image X are reduced by optimizing the solution with regularization by likelihood output by the generative model. The generative model 22 determines the probability or likelihood of normality of the input image 20 and any corrected images from iterations of the optimization. The optimization uses the generative model probabilities to solve for the corrected image with a physics model encoding the transform of the degrading behavior of the particular imaging system.

Additional, different, or fewer acts may be provided. For example, act 30 is replaced with loading a medical image or other type of image. As another example, act 38 is not performed. In yet another example, act 36 is not performed.

The acts are performed in the order shown (top to bottom or numerical), but other orders may be used. For example, acts 32 and 36 are performed as part of act 34.

Figure 4:
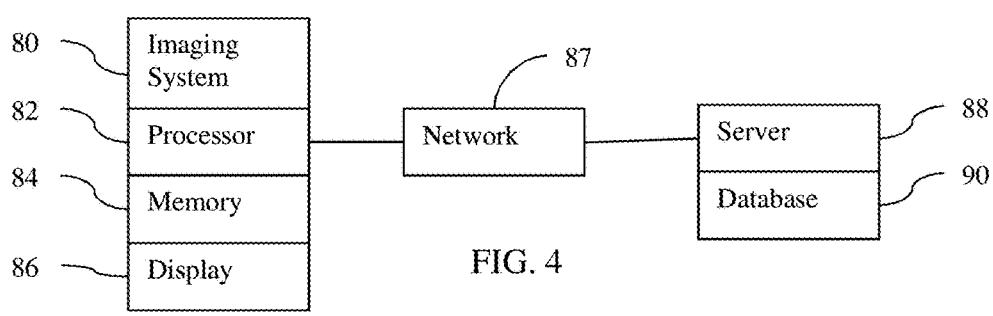
FIG. 4 is a block diagram of one embodiment of a system for correction of an image from an imaging system.

The acts are performed by the system of FIG. 4, other systems, a medical scanner, a workstation, a computer, and/or a server. For example, act 30 is performed by a medical scanner. Acts 32-38 are performed by a processing component or other machine, such as the medical scanner, a workstation, or a computer.

In act 30, a medical scanner acquires an image representing a patient. The image is made available by or within the medical scanner. Acquisition may be through transmission over a network or from a memory. A processor may extract the data from a picture archive communications system (PACS) or a medical records database. Alternatively, data not in the medical environment is acquired, such as capturing or loading a photograph or video. Other sensors (e.g., acoustic transducers or camera) may generate an image in alternative embodiments.

The image is medical imaging data. The medical image is a frame of data representing the patient. The data may be in any format. While the terms image and imaging are used, the image or imaging data may be in a format prior to actual display of the image. For example, the medical image may be a plurality of scalar values representing different locations in a Cartesian or polar coordinate format different than a display format. As another example, the medical image may be a plurality red, green, blue (e.g., RGB) values output to a display for generating the image in the display format. The medical image may be currently or previously displayed image in the display or another format. The image or imaging is a dataset that may be used for imaging, such as scan data representing the patient. The scan data represents measurements Y from a specific medical scanner or imaging system.

Any type of medical image and corresponding medical scanner may be used. In one embodiment, the medical image is a computed tomography (CT) image acquired with a CT system. For example, a chest CT dataset may be used for detecting a bronchial tree, fissures, and/or vessels in the lung. For CT, the raw data from the detector is reconstructed into a three-dimensional representation. As another example, magnetic resonance (MR) data representing a patient is acquired. MR data is acquired with an MR system. The data is acquired using a pulse sequence for scanning a patient. Data representing an interior region of a patient is acquired. For MR, the magnetic resonance data is k-space data. Fourier analysis is performed to reconstruct the data from the k-space into a three-dimensional object or image space. The data may be ultrasound data. Beamformers and a transducer array scan a patient acoustically. The polar coordinate data is detected and processed into ultrasound data representing the patient. The data may be positron emission tomography (PET), single photon emission computed tomography (SPECT), or other nuclear imaging data. Radioactive emissions from within the patient are detected and reconstructed into imaging data.

The medical image represents tissue and/or bone structure of the patient. Alternatively, the medical image represents flow, velocity, or fluids within the patient. In other embodiments, the medical image represents both flow and structure. For PET and SPECT, the scan data represents function of the tissue, such as uptake.

The medical image represents a one, two, or three-dimensional region of the patient. For example, the medical image represents an area or slice of the patient as pixel values. A three-dimensional volume may be represented as pixel values by rendering to a two-dimensional format. As another example, the medical image represents a volume or three-dimensional distribution of voxels. Values are provided for each of multiple locations distributed in two or three dimensions. The medical image is acquired as a frame of data. The frame of data represents the scan region at a given time or period. The dataset may represent the area or volume over time, such as providing a 4D representation of the patient.

The image may include one or more artifacts or distortions. Different modalities of imaging are susceptible to different types of artifacts or corruption. The physics for scanning and/or the processing to create the image from the scan may generate an artifact. Motion of the patient or sensor performing the scan may generate an artifact. Example artifacts in medical imaging include noise, blur (e.g., motion artifact), shading (e.g., blockage or interference with sensing), missing information (e.g., missing pixels or voxels in inpainting due to removal of information or masking), reconstruction (e.g., degradation in the measurement domain), and/or under-sampling artifacts (e.g., under-sampling due to compressed sensing). Other artifacts may be in the image.

Any level of artifact may exist. The scan settings for the medical scanner, condition of the patient, amount of movement, filtering, reconstruction, other image processing, and/or other factors may contribute to different levels of artifacts in an image. One image may include one type or multiple types of artifacts. The level may be a function of the severity (e.g., intensity or contrast) and/or extent (e.g., distribution or number of instances).

The image for a given patient is to be corrected. For example, the correction is for CT, X-ray and MR denoising, MR and ultrasound reconstruction, or MR super-resolution.

The correction uses a probability from a generative model to model what a good image is. In act 32, a machine determines a probability of artifact abnormality for the image with a deep generative machine-learnt model. Any machine capable of applying the deep generative machine-learnt model may be used. For example, a computer inputs the image to learned matrices or a matrix learned as the deep generative machine-learnt model. The generative model encodes training data to a few independent latent variables or learned features, and may generate synthetic data by sampling the latent variables. For the inverse solution to correct image distortion, the generation of synthetic data is not used. The learnt model takes an image as input, but other inputs may be provided, such as clinical data of a patient. The generative model is implemented as a piecewise-differentiable function, such as used in deep learning, and returns a prior log-likelihood.

Any machine-learnt generative model may be used. For example, the generative model is a deep learnt model using Restricted Boltzmann Machines (RBM), Deep Belief Network (DBN), Neural Autoregressive Density Estimators (NADE), Variational Auto-Encoders (VAE), Denoising Auto-Encoders (DAE), Generative Adversarial Networks (GAN), extensions thereof, or other deep learning approaches for generative modeling. In one embodiment, the trained deep generative model is a deep neural network with a set of j convolutional layers and k fully connected layers, each followed by a non-linear activation function, and a set of pooling layers for features reduction. Other layer arrangements may be used.

In deep learning, the latent variables are learned by machine training. The machine learns the generative model from training images of a database. In one embodiment, training is performed using standard generative training, The training images from the database are of similar quality, such as a desired good quality that the generative model will represent. The level of artifact or quality score is above or below a threshold level, depending on whether higher or lower scores indicate better quality. Subjective selection may alternatively or additionally be used. All the images used for training the generative model are of good or the top image quality. Any threshold for quality may be used for the training images, such as only a score of 5 in a score range of 1-5 where 5 is the best quality. In alternative embodiments, a broader range (e.g., moderate level, low level, and/or no artifacts in the images) is used. In yet other embodiments, images of any quality level are used.

The training images are subject to no or little distortion or artifacts. Rather than finding a large number of images associated with a particular artifact, a large number of images with no or little distortion is found. Locating better quality images may be more easily performed than locating images with a particular artifact, as images with artifacts tend to not be stored or recorded. To increase the number of available images of sufficient quality, images corrected using other algorithms may be used. Any number of different approaches are provided for correcting for particular sources of corruption. By applying these approaches, images with reduced artifact or distortion are provided. The images from multiple different types of artifact correction may provide training images. This holistic data acquisition process results in a larger quantity of training data rather than discriminative approaches that may train each network only on images featuring one kind of distortion.

To train the generative model, the model is fed with a set of images of good or similar quality (e.g., determined by their score). The log-likelihood of the output is maximized. Since the output is a probability distribution (i.e.: constrained to sum to 1 over all images), training also implicitly minimizes the likelihood of images not present in the training set, such as low-quality images. The generative model encodes features that represent the good qualities in the images. Since generative training is unsupervised, training does not require matched pairs of good and bad images, which are difficult to acquire on a large scale in a medical setting. To obtain both good and bad images requires scanning patients twice and results in extra dose and/or scan time for with no immediate benefit to the patient.

Since the generative model is used to correct poor quality images, then those poor images may also be included in the training of the generative model assuming the correction is also part of the training. In general, the training is finding the model parameters that minimize the expectation of some loss over the data. One example minimization of the expectation is represented as:

$$\hat{\theta} = \underset{\theta}{\operatorname{argmin}} \mathbb{E}_{(X,Y)}[\mathcal{L}(X, Y, \theta)]$$

where θ is the set of trainable parameters of the prior (e.g. the weights of a neural network,) E is the expectation, Y is the image data, X is the ideal image, and L is loss function. The training may be with X and Y (supervised), only X (unsupervised from only good images), or only Y (unsupervised from bad images). If bad images are used, then the training includes correction. The unsupervised Maximum Likelihood loss function from good images above may be represented as:

$$\mathcal{L}_{(X,\theta)} = -\log p_\theta(X).$$

The unsupervized Maximum A Posteriori loss function used to restore corrupted data may also be used to optimize 8. It may be represented as:

$$\mathcal{L}(Y, \theta) = \min_X(-\log p(Y \mid X) - \log p_\theta(X)).$$

Both of those examples are unsupervised because the examples do not use a matching (X,Y) pair of the corrupted data and target image for the same scan. Other representations, loss functions, or expectation minimization functions may be used.

The generative nature is used to determine a model of a good quality image. The generative model provides features or kernels used to indicate a good quality image. Being based on good quality images, the generative model is generic to the type of artifact. The same generative model may be used for correction of images suffering from any of various types of artifacts.

The generative model is trained with deep machine learning to output a probability of an input image matching good qualities. The probability is a probability of normality or abnormality. Abnormality reflects the likelihood of an artifact. One probability is output for the image. In alternative embodiments, a spatial distribution of probabilities is output, such as calculating the probability for each pixel or voxel based on the intensities or values of surrounding or neighboring pixels or voxels.

The model parameters (e.g., machine trained features, kernels or layer values) are used to compute the probability that the image fits the generative model of good quality. Images that do not match the generative model will have a low probability, hence identifying the image as including one or more potential abnormalities. Images that do match the generative model will have a high probability. Inverse probabilities may be used (e.g., subtract the probability from 1.0). Matching to a generative model of poor or low quality images may be used in other embodiments.

In one embodiment, the deep-generative machine-learnt model is learnt from training images with different types of artifacts including the artifact. The artifacts may be minor, so the training images have a quality above the threshold. In other embodiments, the deep generative machine-learnt model is learnt or trained with multi-objective training. Multi-objective training includes training images labeled as having quality below a threshold or poor quality. Instead of using just good quality images, images with poor quality are also used. The generative model is initially trained with the good quality images, and then the generative model is refined using the multi-objective training to learn a model that can generate data in general and perform well on the task. A semi-supervised or supervised approach is used for refining so that the generative model learns characteristics of the good quality images that distinguish from poor quality images. Both good and poor quality images with ground truth labels are used. This supervised loss from corrupted data may be represented as:

$$\hat{X} = \operatorname*{argmin}_{X}(-\log p(Y \mid X) - \log p_\theta(X))$$

$$\mathcal{L}(X, Y, \theta) = \mathcal{L}_2(X, \hat{X})$$

Multiple losses may be combined to train on all available data (good or all kinds of corruption, with or without supervision). The corruption in the poor-quality images is selected to be specific to the problem, such as noise or motion blur. In one embodiment, the generative model is trained on the good quality images. A collection of bad quality images suffering from a particular type of corruption is used to refine or fine-tune the generative model to make the generative model specific to the type of corruption.

Figure 3:
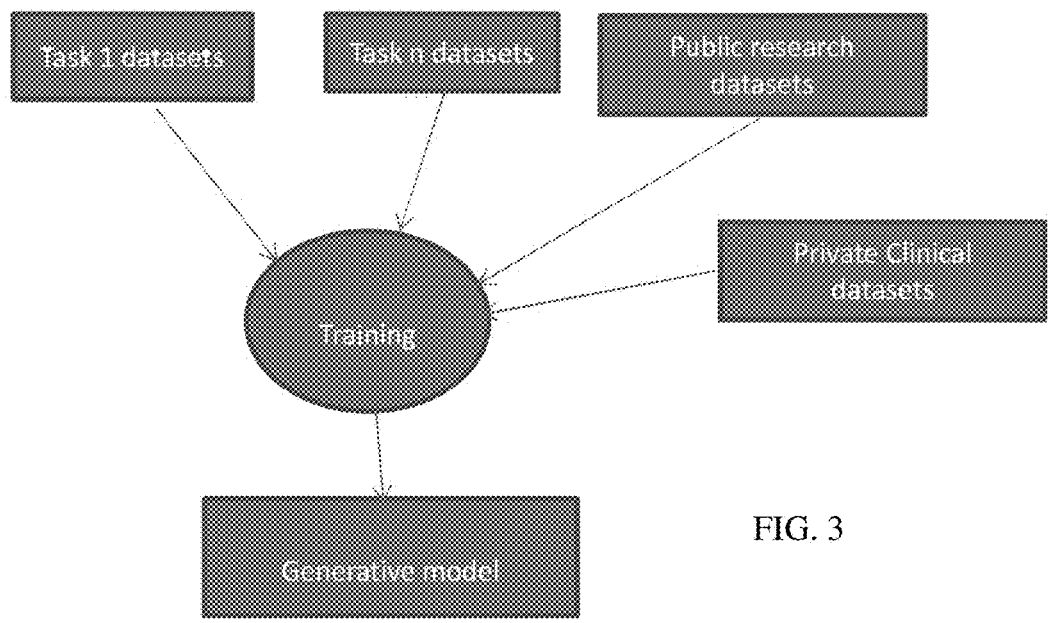
FIG. 3 illustrates multi-objective training of the generative model.

Alternatively, training images having poor quality due to any number of types of distortion may be used to provide a generative model generic to the type of distortion. FIG. 3 shows an example. The public research datasets and/or private clinical datasets are collections of good quality images for a given modality (i.e., type of medical scanner) and/or application. Tasks 1 through n datasets are image datasets suffering from different types of distortion or corruption. The training of the generative model uses all or some of these sources of training data. In alternative embodiments, the good and bad quality training data is used to initially train the generative model rather than using the poor-quality training images for refinement.

While the proposed framework aims at greater flexibility and learnability, any generative model is likely to compute more information than is strictly required for any regularization task of the inverse problem. If computations performance at test time (i.e., during application to a patient's image) is an issue, then a further discriminative network may be trained to distill the inference algorithm. A smaller specialized discriminative network is machine trained to reproduce the results of the complete inference of the generative model. A support vector machine, probabilistic boosting tree, deep learnt neural network, Bayesian, or another machine learnt discriminative network is trained based on the generative model. The generative model provides automated supervision by indicating the ground truth quality of input images, thus increasing the amount of data available for supervised training of the discriminative network. This smaller discriminative network learns from an unlabeled set of corrupted and/or non-corrupted images, using the inference algorithm of the generative model as ground truth.

The resulting discriminative network is applied at test time to the image to output a probability where the probability is based on training from the deep generative machine-learnt model. The discriminative network may be faster than the generative model and requires less annotated data than supervised training from scratch as the generative model provides the ground truth for training.

In act 34 of FIG. 2, the machine optimizes the image. The optimization corrects for distortion in the measurements or image to restore the image to a corrected form. The correction may be partial or complete. The image of any object, such as anatomy of a patient, is optimized to have less distortion or artifact.

The optimization solves for the corrected image from the input image. The solution is an inverse problem. The acquisition of the measurements or image may be modeled. A physics model relates the degrading or corrupting operation of an imaging system to measurements. This data acquisition model may be represented as:

$$p(Y|X)$$

where Y is the measurements corrupted in some way (e.g., blur or noise) and X is the ideal or corrected image.

The desired image may be represented as a parametric prior image model:

$$p_\theta(X).$$

The recovery problem (i.e., inverse solution) is a function of the posterior p(X|Y). Bayes rule provides that:

$$p(X|Y) \propto p(Y|X) p_\theta(X).$$

The solution may be expressed as a maximum a posterior probability estimation (MAP), such as represented by:

$$\hat{X} = \operatorname*{argmin}_{X}(-\log p(Y \mid X) - \log p_\theta(X)).$$

Other representations may be used.

This inverse solution uses the parametric prior image model. The deep-learnt generative model is used as the prior. The inverse solution uses the probability output by the generative model as the regularlizer term. The regularizer term is a measure of fitting of alteration of the measurements or input image Y to an ideal or good quality image. The regularlizer indicates whether a given correction makes the resulting corrected image more like good quality or corrected images. The generative model provides the probability of the corrected image to be of good quality. The log-likelihood or other likelihood derived therefrom output by the machine-learnt generative model is used as the regularizer in the inverse solution.

The inverse solution uses the physics model of the degrading behavior in acquisition in combination with the generative model. Any physics model representing the physical operation of the imaging system to measure or scan may be used. The physics model encodes the transform of the imaging system. The physics model represents at least one image degradation characteristic of how the imaging system works.

Different physics models may be provided for different degradations. For example, the physics model is directed to noise. The noise distribution for MRI is Gaussian and for CT is Poisson. The physics model includes a characteristic specific to the imaging system or medical scanner. The type of imaging system (e.g., CT vs. MRI) provides the specificity. Alternatively, the noise distribution for a specific model is used. Different models have different arrangements, resulting in different noise distribution. In other alternatives, the noise distribution of an individual imaging system as built is determined through calibration and used as the physics model.

The physics model may include distribution for one or more characteristics. The sensitivity, motion (object or imaging system), collimator effects, noise, reconstruction, masking, compression, and/or other artifact causing operations of the imaging system are modeled.

The physics model and the generative model are used together in the inverse problem solution. An example representation using a linear model with white Gaussian noise for the physics model is represented as:

$$\log p(X|Y) = \frac{1}{2\sigma^2}\|Y - AX\|^2 - \log p_\theta(X)$$

where the L2 norm term (Y-AX) includes the physics model with a as the noise distribution and A as the corruption operator applied to the image, and the regularlizer term as log $p_\theta(X)$ being the likelihood from the generative model. Other representations may be used, including non-linear representation.

The inverse solution is optimized by gradient descent. Deep models are usually trained by backpropagation, which is a gradient descent with respect to the inner parameters of the generative model. The inverse solution is likewise performed as a gradient descent. Any gradient-based optimization may be used, such as Bi-conjugate gradient or L-BFGS. In an iterative process, the measurements or image Y after alteration are input to the generative model, providing a probability for that iteration. Other changes are tested in other iterations to identify the alterations providing a sufficiently optimum, best, or optimum corrected image X. The gradient descent is minimized using the physics model in one term and the probability from the generative model in another term (i.e., regularlizer).

The gradient of the regularizer is computed. In one embodiment, the likelihood is the output of the encoder (i.e., generative model) and the encoder is implemented as a piecewise differentiable function such as a neural network. The gradient of the likelihood is computed by backpropagation with respect to the corrected image X. For example, the denoising auto-encoder of the generative model provides a decoder output directly giving the gradient. One example minimization by gradient descent is represented as:

$$\nabla_X \log p(X|Y) = \frac{1}{\sigma^2}A^T(AX - Y) - \nabla_X \log p_\theta(X)$$

$$X_{n+1} = X_n - \alpha_n \nabla_X \log p(X_n|Y)$$

This minimization uses the physics model and the generative model produced likelihood to solve for the corrected image from an input image. The level of the artifact or distortion in the input image Y is minimized, providing the corrected image X. Other minimizations may be used.

In one embodiment, the prior is trained as a Denoising Auto-Encoder D. Its output D(X) is the Minimum Mean Square Error (MMSE) denoised image of its input assuming a Gaussian white noise level 6, and the gradient of the prior can be computed as:

$$\nabla_X \log p_\theta(X) = \frac{D(X) - X}{\sigma^2}$$

This estimation of the gradient becomes more accurate as the noise level σ used to train the denoising auto-encoder becomes smaller. It is asymptotically exact when the noise level tends to 0.

In alternative embodiments, Bayesian methods are used instead of gradient descent. For example, Variational Bayes, message passing, Expectation Propagation, or another approach is used. Expectation of loss based on Monte-Carlo simulation may be used. Integrators may be learned along with the generative model to bypass multi-chain Monte Carlo (MCMC) sampling. A side network is learnt to compute the expectation.

In act 36, a control is provided for the optimization. The control is provided to constrain the optimization and/or as a change for varying the input image Y for each iteration of the optimization. For example, the machine provides a direction, step size, number of iterations, preconditioner, or combinations thereof in the minimizing.

The control may be randomized, a default, a user selected setting, or based on a pattern. For the control of altering the images, the control is based on information from previous iterations and/or from a current iteration. The amount, direction, and/or other variance to alter the measurements Y from the original input and/or the most recent iteration are provided. The number of iterations to use, step sizes, preconditioners (e.g., a matrix applied to the gradient to refine direction), and/or other setting for optimization are provided.

In one embodiment, the gradient direction is determined for each iteration from the generative model. The gradient direction indicates positive or negative changes, or the direction of the change. The gradient direction is determined for the next iteration in the minimization. The gradient direction is determined from the deep generative machine-learnt model. The same backpropagation method of the generative model is used at test time on the image data to obtain a gradient direction that will increase the likelihood of the image fitting the generative model. The data-fitting part of the problem is usually smooth, so the whole inverse problem may be solved by gradient descent.

In an additional or alternative embodiment, the control or controls are provided by a machine-learnt classifier applied to the image. For example, the step sizes are learnt (for each A) for fast convergence at test time. Algorithmic parameters of the optimization, such as step sizes, number of iterations, and preconditioners, are learnt by backpropagation on a problem-specific basis. For the given artifact and/or specific imaging system, machine learning is used to classify the change given an input image, gradient in likelihood, and/or other information used in the minimization. The machine-learnt classifier for the change may be synthesized from good images and the physical model of the degradation. This training is performed in a supervised way, such as using probabilistic boosting tree or support vector machine learning with labeled ground truth data. Since the resulting machine-learnt classifier involves fewer parameters than the generative model, less data and more rapid output are provided.

After the default or set number of iterations, the resulting corrected image is output. Alternatively, the gradient becomes zero (i.e., the alteration resulting in the peak match is found), so the resulting corrected image is output.

In act 38, the machine transmits the corrected image output from the minimization or other optimization. For example, the image of the patient from the medical scanner as corrected is transmitted. The corrected image has less or no distortion previously included in the image. The level of artifact is reduced or minimized.

The transmission is over a network, through a communications interface, into memory or database (e.g., to a computerized patient medical record), or to a display. For example, the corrected image (optimized image) is displayed on a display device.

The optimization uses the generative model, leveraging unlabeled data in the form of good quality images. This generative model is trained once to be used for any number of different forms of corruption as the generative model represents probability of quality of a type of imaging. Images with different sources of artifacts have as the ideal the same good quality. This generative model is also separate from acquisition parameters, such as the settings of the imaging system used to acquire the image. Images from different acquisitions and corresponding different settings have as the ideal the same good quality. As a result, the optimization is robust to different scanner settings. Separate generative models are not needed for different artifacts and/or scanner configurations.

The terms of the inverse solution function are typically balanced in a way specific to the problem (e.g., source of distortion) and imaging system. Rather than requiring hand-tuning of the balance for many different situations, the generative model sets the regularization strength by the amount of corruption. The regularization is self-weighting. The physics model is calibrated to the imaging system, so experimentation to relatively weight the terms is not needed. Relative weighting may be provided in other embodiments.

FIG. 4 shows one embodiment of a system for use in machine learning and/or for application. The system is distributed between the imaging system 80 and a remote server 88. In other embodiments, the system is just the server 88 or just the imaging system 80 without the network 87. In yet other embodiments, the system is a computer or workstation.

The system includes an imaging system 80, a processor 82, a memory 84, a display 86, a communications network 87, a server 88, and a database 90. Additional, different, or fewer components may be provided. For example, network connections or interfaces are provided, such as for networking with a medical imaging network or data archival system. In another example, a user interface is provided. As another example, the server 88 and database 90 are not provided, or only the server 88 and database 90 are provided. In other examples, the server 88 connects through the network 87 with many imaging systems 80 and/or processors 82.

The processor 82, memory 84, and display 86 are part of the medical imaging system 80. Alternatively, the processor 82, memory 84, and display 86 are part of an archival and/or image processing system, such as associated with a medical records database workstation or server, separate from the imaging system 80. In other embodiments, the processor 82, memory 84, and display 86 are a personal computer, such as desktop or laptop, a workstation, a server, a network, or combinations thereof. The processor 82, display 86, and memory 84 may be provided without other components for acquiring data by scanning a patient.

The imaging system 80, processor 82, memory 84 and display 86 are provided at a same location. The location may be a same room, same building, or same facility. These devices are local relative to each other and are remote to the server 88. The server 88 is spaced apart by the network 87 by being in a different facility or by being in a different city, county, state, or country. The server 88 and database 90 are remote from the location of the processor 82 and/or imaging system 80.

The imaging system 80 is a medical diagnostic imaging system. Ultrasound, computed tomography (CT), x-ray, fluoroscopy, positron emission tomography (PET), single photon emission computed tomography (SPECT), and/or magnetic resonance (MR) systems may be used. The imaging system 80 may include a transmitter and includes a detector for scanning or receiving data representative of the interior of the patient.

In one embodiment, the imaging system 80 is a CT system. An x-ray source is connected with a gantry. A detector is also connected with a gantry opposite the x-ray source. The patient is positioned between the source and detector. The source and detector are on opposite sides of the patient and rotate and/or translate about the patient. The detected x-ray energy passing through the patient is converted, reconstructed or transformed into data representing different spatial locations within the patient.

In another embodiment, the imaging system 80 is a MR system. The MR system includes a main field magnet, such as a cryomagnet, and gradient coils. A whole-body coil is provided for transmitting and/or receiving. Local coils may be used, such as for receiving electromagnetic energy emitted by atoms in response to pulses. Other processing components may be provided, such as for planning and generating transmit pulses for the coils based on the sequence and for receiving and processing the received k-space data. The received k-space data is converted into object or image space data with Fourier processing.

The memory 84 may be a graphics processing memory, a video random access memory, a random access memory, system memory, cache memory, hard drive, optical media, magnetic media, flash drive, buffer, database, combinations thereof, or other now known or later developed memory device for storing image data. The memory 84 is part of the imaging system 80, part of a computer associated with the processor 82, part of a database, part of another system, a picture archival memory, or a standalone device.

The memory 84 stores medical imaging data representing the patient, weights or values of parameters making up the layers of the machine-learnt generative model, one or more machine-learnt matrices, values used in optimization, the physics model, and/or corrected images. The memory 84 may store data during processing for application and/or may store training data.

The memory 84 or other memory is alternatively or additionally a non-transitory computer readable storage medium storing data representing instructions executable by the programmed processor 82 for training or use of a machine-learnt generative model in an inverse solution to correct distortions in an image. The instructions for implementing the processes, methods and/or techniques discussed herein are provided on non-transitory computer-readable storage media or memories, such as a cache, buffer, RAM, removable media, hard drive or other computer readable storage media. Non-transitory computer readable storage media include various types of volatile and nonvolatile storage media. The functions, acts or tasks illustrated in the figures or described herein are executed in response to one or more sets of instructions stored in or on computer readable storage media. The functions, acts or tasks are independent of the particular type of instructions set, storage media, processor or processing strategy and may be performed by software, hardware, integrated circuits, firmware, micro code and the like, operating alone, or in combination.

Likewise, processing strategies may include multiprocessing, multitasking, parallel processing, and the like.

In one embodiment, the instructions are stored on a removable media device for reading by local or remote systems. In other embodiments, the instructions are stored in a remote location for transfer through a computer network or over telephone lines. In yet other embodiments, the instructions are stored within a given computer, CPU, GPU, or system.

The processor 82 is a general processor, central processing unit, control processor, graphics processor, digital signal processor, three-dimensional rendering processor, image processor, application specific integrated circuit, field programmable gate array, digital circuit, analog circuit, combinations thereof, or other now known or later developed machine optimizing using a generative model and physics model. The processor 82 is a single device or multiple devices operating in serial, parallel, or separately. The processor 82 may be a main processor of a computer, such as a laptop or desktop computer, or may be a processor for handling some tasks in a larger system, such as in the imaging system 80. The processor 82 is configured by instructions, design, hardware, and/or software to perform the acts discussed herein.

The processor 82 is configured to perform the acts discussed above (e.g., acts 32-38). The processor 82 uses a stored matrix or stored matrices for the machine-learnt generative model. The probability is created by application of the input image to the generative model. The processor 82 uses the likelihood from application of the generative model to an image in regularizing a minimization. The physics model and generative model are used together to correct the image. The processor 82 may apply other machine-learnt classifiers, such as for providing control of the optimization and/or as a substitute classifier learnt using the generative model.

The processor 82 is configured to transmit the corrected image over the network 87, to the display 86, or to the memory 84. The processor 82 may be configured to generate a user interface for receiving corrections or verification of distortion removal.

The display 86 is a monitor, LCD, projector, plasma display, CRT, printer, or other now known or later developed devise for outputting visual information. The display 86 receives images, graphics, text, quantities, or other information from the processor 82, memory 84, imaging system 80, and/or server 88. One or more corrected medical images are displayed. The images are of a region of the patient. The corrected image includes less artifact (number, intensity, visibility, or combinations thereof) than the image prior to correction, so may more accurately portray the patient for diagnosis or therapy planning.

The network 87 is a local area, wide area, enterprise, another network, or combinations thereof. In one embodiment, the network 87 is, at least in part, the Internet. Using TCP/IP communications, the network 87 provides for communication between the processor 82 and the server 88. Any format for communications may be used. In other embodiments, dedicated or direct communication is used.

The server 88 is a processor or group of processors. More than one server 88 may be provided. The server 88 is configured by hardware, firmware, and/or software. In one embodiment, the server 88 performs machine learning with training data in the database 90. The machine-learnt matrices are provided to the processor 82 for application. Alternatively, the server 88 performs the optimization of an image received from the imaging system 80 and provides the corrected image to the imaging system 80.

The database 90 is a memory, such as a bank of memories, for storing training data, such as images and respective scores. Weights or values of parameters of the generative model and/or discriminative classifier are stored in the database 90 and/or the memory 84.

While the invention has been described above by reference to various embodiments, it should be understood that many changes and modifications can be made without departing from the scope of the invention. It is therefore intended that the foregoing detailed description be regarded as illustrative rather than limiting, and that it be understood that it is the following claims, including all equivalents, that are intended to define the spirit and scope of this invention.

We claim:

1. A method for correction of an image from a medical scanner, the method comprising:
   acquiring, by the medical scanner, the image representing a patient, the image having a level of artifact due to the acquisition by the medical scanner;
   determining, by a machine, a probability of artifact abnormality for the image with a deep generative machine-learnt model;
   minimizing, by the machine, the level of the artifact in the image, the minimizing being a function of a physics model and the probability, the physics model including a characteristic specific to the medical scanner; and
   transmitting the image output from the minimizing, the image being of the patient and from the medical scanner with the level of the artifact minimized, wherein determining comprises determining with the deep generative machine-learnt model learnt with only training images having a quality above a threshold.

2. The method of claim 1 wherein acquiring comprises computed tomography, magnetic resonance, ultrasound, positron emission tomography, or single photon emission computed tomography image.

3. The method of claim 1 wherein acquiring comprises representing the output as a two-dimensional representation of pixels or a three-dimensional set of voxels as the image.

4. The method of claim 1 wherein acquiring comprises acquiring with corruption by noise artifact, blur artifact, inpainting artifact, reconstruction artifact, or combinations thereof.

5. The method of claim 1 wherein determining comprises determining the probability to maximize the log-likelihood of the good training images matching the deep generative machine-learnt model.

6. The method of claim 1 wherein determining comprises determining with the deep-generative machine-learnt model learnt from training images with different types of artifacts including the artifact.

7. The method of claim 1 wherein determining comprises determining with a machine-learnt discriminative network trained from the deep generative machine-learnt model.

8. The method of claim 1 wherein minimizing comprises inversely solving with the probability as a regularizer term.

9. The method of claim 1 wherein minimizing comprises minimizing by gradient descent with the physics model in a first term and a gradient of the probability in a second term, the physics model including a distribution of the characteristic specific to the medical scanner.

10. The method of claim 1 wherein minimizing further comprises determining a gradient direction for a next iteration in the minimizing, the gradient direction determined from the deep generative machine-learnt model.

11. The method of claim 1 further comprising providing a step size, number of iterations, preconditioner, or combinations thereof in the minimizing with a machine-learnt classifier applied to the image.

12. The method of claim 1 wherein transmitting comprises transmitting the image to a display.

13. The method of claim 1 wherein determining comprises determining with the deep generative machine-learnt model learnt with multi-objective training including training images labeled as having quality below a threshold.

14. The method of claim 13 wherein determining comprises determining the probability to maximize the posterior likelihood of the corrected images obtained from the bad training images.

15. The method of claim 1 wherein determining comprises determining with the deep generative machine-learnt model learnt with multi-objective training including training pairs of low-quality images with corresponding target output image of the artifact correction.

16. The method of claim 15 wherein determining comprises determining the probability to minimize a difference between the target output image and the application of the correction applied to the low-quality images.

17. A method for reducing distortion in an image from an imaging system, the method comprising:
optimizing, by a machine, the image of an object to have less of the distortion, the optimizing being with a gradient-based optimization including a regularizer from a log-likelihood output by a machine-learnt generative model; and
displaying, by a display, the image as optimized.

18. The method of claim 17 wherein optimizing comprises optimizing with a physics model encoding a transform of the imaging system.

19. The method of claim 17 wherein optimizing comprises optimizing with the machine-learnt generative model being based on training images having a quality above a threshold and being based on a supervised sub-set of training imaging having known ground truth relative to a type of the distortion.

20. A method for correction of a first image from an imaging system, the method comprising:
acquiring, by the imaging system, the first image having a distortion due to the acquisition by the imaging system;
determining, by a machine, a likelihood of the first image having the distortion with a deep generative machine-learnt model;
solving for a corrected image from the first image, the solving using the likelihood and a transform for the imaging system; and
transmitting the corrected image, wherein determining comprises determining with the deep generative machine-learnt model trained with multi-objective training.

* * * * *